United States Patent [19]

Wang et al.

[11] Patent Number: 5,108,824
[45] Date of Patent: Apr. 28, 1992

[54] RUBBER MODIFIED EPOXY RESINS

[75] Inventors: Chun S. Wang; Douglas G. Kleweno, both of Lake Jackson, Tex.

[73] Assignee: The Dow Chemical Company, Midland, Mich.

[21] Appl. No.: 477,379

[22] Filed: Feb. 6, 1990

[51] Int. Cl.⁵ ............................................... B32B 1/04
[52] U.S. Cl. .................................. 428/76; 525/101; 525/105; 525/501
[58] Field of Search ................... 525/501, 101, 105; 428/76

[56] References Cited

U.S. PATENT DOCUMENTS

| | | | |
|---|---|---|---|
| 3,391,354 | 1/1976 | Sheppard et al. | 332/31 |
| 3,926,885 | 12/1977 | Keil | 260/29.15 B |
| 4,016,022 | 4/1977 | Browning et al. | 156/330 |
| 4,022,753 | 5/1977 | Lohse et al. | 260/46.5 R |
| 4,055,541 | 10/1977 | Riew | 260/47 EN |
| 4,107,116 | 8/1978 | Riew et al. | 260/23 EP |
| 4,283,513 | 8/1981 | Mikami | 525/476 |
| 4,338,225 | 7/1982 | Sheppard | 525/122 |
| 4,604,435 | 8/1986 | Koshii et al. | 525/476 |
| 4,628,022 | 12/1986 | Ors et al. | 430/280 |
| 4,690,988 | 9/1987 | Hoffman et al. | 525/502 |
| 4,707,518 | 11/1987 | Shah | 525/122 |
| 4,707,529 | 11/1987 | Hoffman et al. | 525/476 |
| 4,708,996 | 12/1987 | Hoffman et al. | 525/530 |

FOREIGN PATENT DOCUMENTS

| | | |
|---|---|---|
| 61-99356 | 5/1986 | Japan . |
| 61-99357 | 5/1986 | Japan . |
| 61-99358 | 5/1986 | Japan . |
| 61-222152 | 10/1986 | Japan . |
| 61-233051 | 10/1986 | Japan . |
| 281120 | 12/1986 | Japan . |
| 62-22849 | 1/1987 | Japan . |
| 62-22850 | 1/1987 | Japan . |

OTHER PUBLICATIONS

H. Lee, et al. Handbook of Epoxy Resins, 1967, pp. 17-23-25.
W. Noll, Chemistry and Technology of Silicones, 1968, pp. 179 and 579.

Primary Examiner—Melvyn I. Marquis

[57] ABSTRACT

Epoxy resins have been reacted with a copolymer of a diunsaturated aliphatic compound and acrylonitrile or methacrylonitrile and a siloxane-containing polymer resulting in a rubber modified epoxy resin suitable for use in electrical and electronic component encapsulation formulations which provide such components with improved thermal shock performance. The rubber modified epoxy resins have improved flexural properties with minimal reduction in glass transition temperature.

11 Claims, No Drawings

RUBBER MODIFIED EPOXY RESINS

FIELD OF THE INVENTION

The present invention pertains to rubber modified epoxy resins, curable compositions thereof and resultant cured products.

BACKGROUND OF THE INVENTION

Presently, most semiconductor devices are sealed or encapsulated with an epoxy resin based plastic molding encapsulant. The dramatic increase in the memory capacity of these semiconductor devices has greatly increased the degree of integration and are moving toward larger chip size and finer circuitry. The larger chip size and finer circuits have made these micro devices more susceptible to failure due to internal stress believed to be produced by the shrinkage during the cooling process from curing temperature to room temperature. This thermal stress is believed to be the primary cause for such failures as package crack, passivation film crack, wire deformation and delamination of the encapsulated micro devices during temperature fluctuations.

Present electronic grade epoxy resin based molding formulations do not possess the physical properties required to withstand the vigorous thermal environment the integrated circuit devices will experience during actual usage. Formulators are presently blending commercially available elastomeric additives into their molding or encapsulating formulations in order to increase toughness so as to enable the encapsulated device to withstand thermal shock, i.e. cycling from cold to hot temperatures. However, only a marginal increase in toughness with a decrease in the glass transition (Tg) temperature is obtained by this additive method.

It would therefore be desirable to have available an epoxy resin base which would enable the resultant encapsulated or molded electrical or electronic devices to possess increased toughness, thermal shock resistance with a minimal loss in the glass transition temperature.

SUMMARY OF THE INVENTION

One aspect of the present invention pertains to an epoxy resin composition having a rubber or elastomeric component to its backbone which composition comprises the product resulting from reacting a composition comprising (A) at least one epoxy resin having an average of more than one vicinal epoxide group per molecule;

(B) at least one copolymer prepared from (a) at least one diunsaturated aliphatic hydrocarbon and (b) at least one of acrylonitrile or methacrylonitrile; and (C) at least one silicone rubber or elastomer compound containing a plurality of —O—Si(R$_2$)—O— groups wherein each R is independently an alkyl group having from 1 to 10 carbon atoms; wherein each of components (B) and (C) contains (a) an average of more than one group reactive with a vicinal epoxide group or (b) a vicinal epoxide group; with the proviso that if one of components (B) and (C) contains a vicinal epoxide group, then the other component must contain groups which are reactive with vicinal epoxide groups.

Another aspect of the present invention pertains to a curable composition comprising the above rubber or elastomer modified epoxy resin composition and a curing amount of one or more suitable curing agents therefor.

A further aspect of the present invention pertains to the product resulting from curing the aforementioned curable composition.

A still further aspect of the present invention pertains to an electrical or electronic device encapsulated or molded with a composition containing the aforementioned curable composition which curable composition has subsequently been cured.

The present invention offers one or more of the following advantages over an ordinary epoxy resin for use in electronic encapsulant or molding formulations.

1. The modified resin can directly substitute as the epoxy component of encapsulant or molding formulations. For the case where an elastomeric additive has been blended into the transfer molding compound (TMC), this additive can be eliminated entirely from the formulation.

2. The modified resin when incorporated into a TMC substantially increases the toughness of the TMC and thus improve fracture resistance.

3. The modified resin containing TMC exhibits substantially better thermal shock resistance than that of an unmodified resin.

4. The modified resin containing TMC has a lower flexural modulus than that of an unmodified resin which is advantageous in lowering the internal stress of the electronic component.

5. TMC containing a modified resin has very minimal reduction in Tg from that of a TMC using an unmodified resin.

DETAILED DESCRIPTION OF THE INVENTION

The rubber modified epoxy resin compositions of the present invention can be prepared by reacting a mixture of epoxy resin, component (A), diene/acrylonitrile or methacrylonitrile copolymer, component (B) and silicone containing polymer, component (C) at a temperature of from about 50° C. to about 200° C., preferably from about 70° C. to about 180° C., more preferably from about 100° C. to about 180° C. for a time sufficient to complete the reaction, suitably from about 1 to about 10, preferably from about 2 to about 8, more preferably from about 4 to about 6, hours.

The components are employed in amounts such that the epoxy resin constitutes from about 60 to about 95, preferably from about 70 to about 90, more preferably from about 80 to about 90, percent by weight based on the combined weight of components (A), (B) and (C) is contributed by component (A); from about 5 to about 40, preferably from about 10 to about 30, more preferably from about 10 to about 20, percent by weight based on the combined weight of components (A), (B) and (C) is contributed by components (B) and (C).

The rubber or elastomer compounds, components (B) and (C) are employed in a ratio of from about 25 to about 75, preferably from about 40 to about 60, most preferably from about 45 to about 55, percent by weight component (B) based upon the combined weight of components (B) and (C); and from about 75 to about 25, preferably from about 60 to about 40, most preferably from about 55 to about 45, percent by weight component (C) based upon the combined weight of components (B) and (C).

Suitable epoxy resins which can be employed herein as component (A) include, for example, any epoxy resin or mixture of epoxy resins which contain aromatic rings and an average of more than one, preferably more than two, vicinal epoxide groups per molecule.

Suitable such epoxy resins include, for example, glycidyl ethers of biphenol, hydrocarbon or halogen, preferably chlorine or bromine, substituted biphenol, bisphenols, hydrocarbon or halogen, preferably chlorine or bromine, substituted bisphenols, phenol-aldehyde novolac resins, hydrocarbon or halogen, preferably chlorine or bromine, substituted phenol-aldehyde novolac resins, tris(hydroxyphenyl)alkanes, unsaturated hydrocarbon-phenol resins, unsaturated hydrocarbon- hydrocarbon or halogen, preferably chlorine or bromine, substituted phenol resins, any combination thereof and the like.

Particularly suitable epoxy resins which can be employed herein include, the glycidyl ethers of phenol-formaldehyde novolac resins, cresol-formaldehyde novolac resins, diclopentadiene- or higher oligomers of cyclopentadiene-phenol resins, diclopentadiene- or higher oligomers of cyclopentadiene-cresol resins, any combination thereof and the like. These epoxy resins have average epoxide functionalities of from about 2.1 to about 8, preferably from about 3 to about 7, most preferably from about 3 to about 6.

Rubber or elastomer compounds which are suitable for use as component (B) include, for example, copolymers of (a) one or more diunsaturated hydrocarbons having from about 4 to about 12, preferably from about 4 to about 10, more preferably from about 4 to about 8, carbon atoms and (b) acrylonitrile or methacrylonitrile or a combination thereof; which polymers contain vicinal epoxy groups or groups reactive with vicinal epoxy groups such as, caboxyl groups, primary or secondary amine groups, or aromatic hydroxyl groups, or a combination of such groups.

Suitable diunsaturated hydrocarbons which can be employed to prepare the polymers employed as the rubber or elastomer compounds, component (B), include, for example, the aliphatic dienes having from about 4 to about 12, preferably from about 4 to about 10, more preferably from about 4 to about 8, carbon atoms per molecule.

Particularly suitable diunsaturated hydrocarbon include, for example, butadiene, pentadiene, hexadiene, heptadiene, octadiene, isomers of any of the foregoing, any combination thereof and the like.

These polymers which are employed as the rubber or elastomer component (B) suitably contain from about 25 to about 75, preferably from about 40 to about 70, more preferably from about 50 to about 70, percent by weight diunsaturated aliphatic hydrocarbons and from about 75 to about 25, preferably from about 30 to about 60, more preferably from about 30 to about 50, percent by weight acrylonitrile or methacrylonitrile or combination thereof.

The polymers which are employed herein as the rubber or elastomer component (B) contain from about 0.5 to about 10, preferably from about 1 to about 5, more preferably from about 1 to about 3 percent by weight vicinal epoxide groups or groups reactive with vicinal epoxide groups or combination thereof.

The polymers which are employed herein as the rubber or elastomer component (B) have a weight average molecular weight of from about 1,000 to about 20,000, preferably from about 1,000 to about 10,000, more preferably from about 1,000 to about 5,000.

Suitable silicone rubber or elastomer compounds which can be employed herein as component (C) include polymers containing repeating units of the —(O—Si($R_2$)—O)— group wherein each R is independently an alkyl group having from 1 to about 6, preferably from 1 to about 4, more preferably from 1 to about 3, carbon atoms. More preferably, each R group is a methyl group.

The polymers which are employed herein as the silicone rubber or elastomer component (C) contain from about 0.5 to about 10, preferably from about 1 to about 5, more preferably from about 1 to about 3 percent by weight vicinal epoxide groups or groups reactive with vicinal epoxide groups or combination thereof.

The polymers which are employed herein as the silicone rubber or elastomer component (C) have a weight average molecular weight of from about 1,000 to about 30,000, preferably from about 3,000 to about 25,000, more preferably from about 5,000 to about 15,000.

When one of the rubber or elastomer components (B) or (C) contains only vicinal epoxide groups and no groups reactive with vicinal epoxy groups, the other rubber or elastomer component (B) or (C) must contain at least two groups which are reactive with an epoxide group per molecule in order to insure that both of the rubber or elastomer compounds (B) and (C) become incorporated into the epoxy resin backbone.

Suitable curing agent which can be employed herein include, for example, aromatic, cycloaliphatic, and aliphatic amines, aromatic, cycloaliphatic, and aliphatic polycarboxylic acids and anhydrides thereof, guanadines, biguanides, aromatic hydroxyl-containing compounds, aromatic hydroxyl-containing phenol or substituted phenol-aldehyde novolac resins, diunsaturated aliphatic- or diunsaturated cycloaliphatic-phenol or substituted phenol resins, combinations thereof and the like.

Particularly suitable curing agents include, for example, phenol-formaldehyde novolac resins, cresol-formaldehyde novolac resins, dicyclopentadiene-phenol resin, combinations thereof and the like. Most preferably, the curing agents are the aromatic hydroxyl-containing compounds such as, for example, phenol-formaldehyde novolac resins, cresol-formaldehyde novolac resins, diclopentadiene- or higher oligomers of cyclopentadiene-phenol resins, diclopentadiene- or higher oligomers of cyclopentadiene-cresol resins, any combination thereof and the like which have an average of from about 2.1 to about 8, preferably from about 3 to about 7, more preferably from about 3 to about 6, aromatic hydroxyl groups per molecule.

The curing agents are employed in an amount which is effective in curing the rubber or elastomer modified epoxy resin of the present invention.

If desired, various additives such as, pigments, dyes, fillers, flame retardants or suppressants, coupling gents mold releasing agents, combinations thereof and the like.

These additives when employed are employed in functionally equivalent amounts which is suitable for the purpose for which they are added.

EXAMPLE 1

Epoxy resin with amine functional butadiene-acrylonitrile copolymer rubber plus epoxide functional polydimethylsiloxane rubber.

Into a 1-liter reaction vessel equipped with an agitator, a temperature control and indicating means is added 450 g of an epoxy cresol formaldehyde novolac resin having a softening point of 71° C., containing 22% epoxide and average epoxy functionality of about 6, 25 g of an amine functional butadiene-acrylonitrile copolymer having a weight average molecular weight of 6400 and an amine equivalent weight of 1200 and 25 g of a glycidyloxypropyl polydimethylsiloxane having a weight average molecular weight of 30,000 and an epoxide equivalent weight of 2000. The mixture is heated to melt and then agitated at 170° C. for 2 hours to give a product with a softening point of 77.4° C. and epoxide content of 19.87% (216.4 EEW).

EXAMPLE 2

Epoxy resin with carboxyl functional butadiene-acrylonitrile copolymer rubber plus epoxide functional polydimethylsiloxane rubber.

Into a 1-liter reaction vessel equipped with an agitator, a temperature control and indicating means is added 425 g of an epoxy cresol formaldehyde novolac resin having a softening point of 71° C., containing 22% epoxide (195.45 EEW) and an average epoxide functionality of about 6, 50 g of a carboxyl functional butadiene-acrylonitrile copolymer having a weight average molecular weight of 16,200 and a carboxyl equivalent weight of 1800, and 25 g of a glycidyloxypropyl polydimethylsiloxane having a weight average molecular weight of 20,000 and an epoxide equivalent weight of 2000. The mixture is heated to melt and maintained at 170° C. with agitation for 2 hours to give a product with a softening point of 75.7° C. and an epoxide content of 18.28% (235.3 EEW).

EXAMPLE 3

Epoxy resin with carboxyl functional butadiene-acrylonitrile copolymer rubber plus amine functional polydimethylsiloxane rubber.

Into a 1-liter reaction vessel equipped with an agitator, a temperature control and indicating means is added 450 g of an epoxy cresol formaldehyde novolac having a softening point of 71° C., containing 22% epoxide (195.45 EEW) and an average epoxide functionality of about 6, 40 g of a carboxyl functional butadiene-acrylonitrile copolymer having a weight average molecular weight of 16,200 and a carboxyl equivalent weight of 1,800 and 10 g of polydimethylsiloxane containing an aminopropyl side chain having a weight average molecular weight of 9,700 and an amine equivalent weight of 1,800. The mixture is heated to melt and then maintained at 170° C. with agitation for 2 hours to give a product with a softening point of 77.5° C. and epoxide content of 19.26% (223.3 EEW).

EXAMPLE 4

Epoxy resin with carboxyl functional butadiene-acrylonitrile copolymer rubber plus amine functional polydimethylsiloxane rubber.

Into a 1-liter reaction vessel equipped with an agitator, a temperature control and indicating means is added 450 g of an epoxy cresol formaldehyde novolac resin having a softening point of 71° C., containing 22% epoxide (195.45 EEW) with an average epoxide functionality of about 6, 25 g of carboxyl functional butadiene-acrylonitrile copolymer having a weight average molecular weight of 16,200 and a carboxyl equivalent weight of 1800 and 25 g of polydimethylsiloxane rubber containing aminopropyl dimethyl side chain having a weight average molecular weight of 27,000 and an amine equivalent weight of 10,000. The mixture is heated to melt and then maintained at 170° C. with agitation for 3 hours to give a product with a softening point of 77.3° C. and an epoxide content of 19.0% (226.3 EEW).

COMPARATIVE EXPERIMENT A

Epoxy resin modified with epoxide functional polydimethylsiloxane rubber.

Into a 1-liter reaction vessel equipped with an agitator, a temperature control and indicating mean is added 500 g of an epoxy cresol-formaldehyde novolac resin having a softening point of 71° C., containing 22% epoxide (195.45 EEW) and having an average epoxide functionality of about 6 and 37.5 g of glycidyloxypropyl polydimethylsiloxane having a weight average molecular weight of 20,000 and an epoxide equivalent weight of 2,000. The mixture is heated to melt and maintained at 150° C. with agitation for 2 hours to give a product with a viscosity of 289 centipoise (0.289 Pa.s) at 150° C. and an epoxide content of 20.18% (213.1 EEW).

COMPARATIVE EXPERIMENT B

Methyl Phenyl polysiloxane rubber modified epoxy resin.

Into a 1-liter reaction vessel equipped with an agitator, a temperature control and indicating means is added 500 g of epoxy cresol-formaldehyde novolac having a softening point of 71° C., containing 22% epoxide (195.45 EEW) and having an average epoxide functionality of about 6 and 37.5 g of methyl phenyl polysiloxane rubber having a weight average molecular weight of 10,000. The mixture is heated to melt and maintained at 150° C. with agitation for 2 hours to give a product with a viscosity of 242 centipoise (0.242 Pa.s) at 150° C. and an epoxide content of 21.08% (204 EEW).

COMPARATIVE EXPERIMENT C

Hydroxyl functional polydimethyl siloxane rubber modified epoxy resin.

Into a 1-liter reaction vessel equipped with an agitator, a temperature control and indicating means is added 450 g of epoxy cresol-formaldehyde novolac resin having a softening point 71° C., containing 22% epoxide (195.45 EEW) and having an average epoxide functionality of about 6, 50 g of hydroxyl terminated polydimethylsiloxane having a weight average molecular weight of 36,000 and a hydroxyl equivalent weight of 110, and 220 g of toluene. The mixture is heated with agitation to 100° C. to achieve a complete solution. Ethyl triphenyl phosphonium acetic.acetic acid complex catalyst as a 70% by weight solution in methanol (0.25 g) is added and the temperature of the resulting solution is raised to 170° C. by evaporating off toluene. After 4 hour reaction at 170° C., the residual toluene is completely removed under a reduced pressure to give an opaque product with a softening point of 72.7° C. and epoxide content of 19.8% (217.2 EEW).

COMPARATIVE EXPERIMENT D

Carboxyl Terminated Butadiene-Acrylonitrile Copolymer (CTBN) modified Epoxy resin.

Into a 1-liter reaction vessel equipped with an agitator, a temperature control and indicating means is added 500 g of epoxy cresol-formaldehyde novolac (softening point 71° C. containing 22% epoxide (195.45 EEW) and with an average epoxide functionality of about 6) and 50 g of HYCAR ™ CTBN 1300X8 (commercially available from B. F. Goodrich), a carboxyl functional terminated butadiene acrylonitrile copolymer rubber having a weight average molecular weight of 3,000 and a carboxyl equivalent weight of 1,500. The mixture is heated to 130° C. to completely mixed and then 2.5 g of triphenyl phosphine catalyst is added. The mixture is further reacted at 130° C. with agitation for 2 hours to give a product containing 19.28% epoxide with 441 centipoise (0.441 Pa.s) viscosity at 150° C.

COMPARATIVE EXPERIMENT E

Carboxyl Terminated Butadiene-Acrylonitrile Copolymer (CTBN) modified epoxy resin.

Into a 1-liter reaction vessel equipped with an agitator, a temperature control and indicating means is added 500 g of epoxy cresol-formaldehyde novolac (softening point 71° C. containing 22% epoxide, and with an average epoxide functionality of about 6) and 25 g of HYCAR ™ CTBN 1300×8 (B. F. Goodrich) a carboxyl functional butadiene acrylonitrile copolymer rubber having a 3,000 weight average molecular weight a carboxyl equivalent weight of 1,500. The mixture is further reacted with agitation for 2 hours to give a product containing 20.2% to epoxide with 315 centipoise (0.315 Pa.s) viscosity at 150° C.

The rubber modified resins prepared in the foregoing Examples and Comparative Experiments are formulated into encapsulating or molding compositions. The formulations are indicated in Table I. The physical properties of the formulations are given in Table II and the results of thermal shock cycling of an electrical component encapsulated with the formulations are given in Table III. The formulations are cured at 175° C. for 4 hours prior to testing.

TABLE I

| | MOLDING COMPOUNDS FORMULATION | | | | | | | | | |
|---|---|---|---|---|---|---|---|---|---|---|
| | Formulation | | | | | | | | | |
| Component | A | B | C | D | Control | E* | F* | G* | H* | I* |
| Epoxy I, | | | | | | | | | | |
| Type | Ex. 1 | Ex. 2 | Ex. 3 | Ex. 4 | Control[a] | C.E. A | C.E. B | C.E. C | C.E. D | C.E. E |
| grams | 174.8 | 179.5 | 176.6 | 177.5 | 168.5 | 173.7 | 174.6 | 175 | 176.4 | 173.6 |
| Epoxy II[b] grams | 26.3 | 26.3 | 26.3 | 26.3 | 26.3 | 26.3 | 26.3 | 26.3 | 26.3 | 26.3 |
| Curing Agent[c], gms | 89.9 | 85.2 | 88.1 | 87.3 | 96.2 | 88.5 | 87.7 | 89.7 | 85.9 | 88.6 |
| Catalyst[d], grams | 2.0 | 2.0 | 2.0 | 2.0 | 2.0 | 2.0 | 2.0 | 2.0 | 2.0 | 2.0 |
| Mold Release Agent[e], gms | 4.0 | 4.0 | 4.0 | 4.0 | 4.0 | 4.0 | 4.0 | 4.0 | 4.0 | 4.0 |
| Coupling Agent[f], gms | 4.0 | 4.0 | 4.0 | 4.0 | 4.0 | 4.0 | 4.0 | 4.0 | 4.0 | 4.0 |
| Fused Silica, g | 685.0 | 685.0 | 685.0 | 685.0 | 685.0 | 685.0 | 685.0 | 685.0 | 685.0 | 685.0 |
| $Sb_2O_3$, gms | 10.0 | 10.0 | 10.0 | 10.0 | 10.0 | 10.0 | 10.0 | 10.0 | 10.0 | 10.0 |
| Carbon Black, gms | 4.0 | 4.0 | 4.0 | 4.0 | 4.0 | 4.0 | 4.0 | 4.0 | 4.0 | 4.0 |

Footnotes to Table I
*Not an example of the present invention.
[a] A cresol-formaldehyde novolac epoxy resin having an EEW of 195 and an average functionality of 6.
[b] Diglycidyl ether of tetrabromobisphenol A having an EEW of 465 and a bromine content of 47.6 percent by weight.
[c] A phenol-formaldehyde novolac resin having a phenolic hydroxyl equivalent weight of 104 and a phenolic hydroxyl functionality of 6.
[d] Triphenyl phosphine.
[e] Montan OP & E wax from American Hoechst Co.
[f] An epoxy silane designated as Z-6040 from Dow Corning.

TABLE II

| | Physical Properties | | | | | | | | | |
|---|---|---|---|---|---|---|---|---|---|---|
| | Formulation | | | | | | | | | |
| Property | A | B | C | D | Control* | E* | F* | G* | H* | I* |
| Flex. Mod.[a], | | | | | | | | | | |
| Mpsi | 1.90 | 1.67 | 1.94 | 1.85 | 2.10 | 1.92 | 1.93 | 1.87 | 1.88 | 2.05 |
| GPa | 13.1 | 11.51 | 13.37 | 12.75 | 14.47 | 13.24 | 13.31 | 12.89 | 12.96 | 14.13 |
| Flex. Str.[a] | | | | | | | | | | |
| kpsi | 19.2 | 17.4 | 18.7 | 18.2 | 20.2 | 17.9 | 17.4 | 19.0 | 18.9 | 19.4 |
| MPa | 132.3 | 120 | 128.9 | 125.5 | 139.3 | 123.4 | 120 | 131 | 130.3 | 133.8 |
| % Strain @ failure | 1.14 | 1.08 | 1.20 | 1.17 | 1.03 | 1.02 | 0.96 | 1.11 | 1.12 | 1.03 |
| Tg[b] (°C.) | 167 | 165 | 159 | 159 | 166 | 157 | 157 | 165 | 148 | 153 |

*Not an example of the present invention.
[a] Flexural testing is by ASTM C790-84A (1984) with sample size of 5" × 0.5" × 0.25" (127 mm × 1≈2.7 mm × 6.35 mm) at a crosshead speed of 0.11 in./min. (2.79 mm/min.) and a span of 4 in. (101.6 mm).
[b] Glass Transition temperature by thermomechanical analysis at 10° C. from 100° C. to 200° C. Thermal Shock Testing The thermal shock data provided in Table III is determined from the physical integrity of the transfer molding compound after it has been thermally cycled from −65° C. to 150° C. with a 10 minute total cycle time by dipping the devices alternately into liquid baths at −65° C. and 150° C. This test method is in accordance with a provision of MIL standard 883. The criterion for failure is visually monitoring encapsulated 14

DIPs for cracks on the surface of the package or at the interface between the package and the metal lead frame.

Typically, thermal shock performance is monitored at the number of cycles necessary to achieve 50% failure of the test devices.

From Table III, it is apparent that the present invention out performs traditional formulations (Comparative Experiments) for encapsulating or molding of electrical and electronic components. Although the carboxyl terminated butadiene-acrylonitrile copolymer modified epoxy resin (Formulation H) exhibited good thermal shock resistance, its Tg decreased drastically making it unsuitable for encapsulation or molding of electrical or electronic components.

TABLE III

| Formula | Results of Thermal Shock Testing Percent Failure After Indicated Cycles | | | | | | | | | |
|---|---|---|---|---|---|---|---|---|---|---|
| tion | 250 | 500 | 750 | 1,000 | 1,500 | 2,000 | 2,500 | 3,000 | 3,500 | 4,000 |
| A | 0 | 0 | 6.7 | 10.0 | 16.7 | 23.3 | 30.3 | 30.0 | 33.3 | 36.7 |
| B | 0 | 3.3 | 6.7 | 6.7 | 16.7 | 23.3 | 26.7 | 40.0 | 43.3 | 46.7 |
| C | 6.9 | 10.3 | 13.8 | 17.2 | 20.7 | 27.6 | 27.6 | 37.9 | 44.8 | 44.8 |
| D | 7.4 | 7.4 | 11.1 | 11.1 | 14.8 | 22.2 | 29.6 | 33.3 | 33.3 | 33.3 |
| Control* | 27.6 | 51.6 | 62.0 | 69.8 | 78.5 | 83.7 | 88.0 | N.T. | N.T. | N.T. |
| E* | 10.0 | 13.3 | 26.7 | 33.3 | 50.0 | 53.3 | 73.3 | N.T. | N.T. | N.T. |
| F* | 16.7 | 26.7 | 46.7 | 63.3 | 83.3 | N.T. | N.T. | N.T. | N.T. | N.T. |
| G* | 10.3 | 17.2 | 20.7 | 24.1 | 31.0 | 34.5 | 48.3 | 65.5 | 65.5 | 72.4 |
| H* | 0 | 0 | 3.4 | 3.4 | 16.9 | 17.2 | 31.0 | 41.4 | 44.8 | 48.3 |
| I* | 3.4 | 3.4 | 6.8 | 6.8 | 13.8 | 35.0 | 60.0 | 82.8 | 89.6 | N.T. |

*Not an example of the present invention.

What is claimed is:

1. An electrical or electronic device encapsulated or molded with a curable composition which has subsequently been cured, said curable composition comprising
   (I) An epoxy resin composition having a rubber or elastomeric component in its backbone which composition comprises the product resulting from reacting a composition comprising
      (A) at least one epoxy resin having an average of more than one vicinal epoxide group per molecule;
      (B) at least one copolymer prepared from (a) at least one diunsaturated aliphatic hydrocarbon and (b) at least one of acrylonitrile or methacrylonitrile; and
      (C) at least one silicone rubber or elastomer compound containing a plurality of —O—Si(R$_2$)—O— groups wherein each R is independently an alkyl group having from 1 to about 10 carbon atoms;
   wherein each of components (B) and (C) contains (a) an average of more than one group reactive with a vicinal epoxide group or (b) a vicinal epoxide group; with the proviso that if one of components (B) and (C) contains a vicinal epoxide group, then the other component must contain groups which are reactive with vicinal epoxide groups; and
      (II) a curable quantity of at least one curing agent for component (I).

2. An electrical or electronic device of claim 1 wherein
   (a) component (A) is present in an amount of from about 60 to about 95 percent by weight based upon the combined weight of components (A), (B) and (C);
   (b) components (B) and (C) are present in a combined amount of from about 40 to about 5 percent by weight of the combined weight of components (A), (B) and (C);
   (c) component (B) is present in an amount of from about 25 to about 75 percent by weight based upon the combined weight of components (B) and (C); and
   (d) component (C) is present in an amount of from about 75 to about 25 percent by weight based upon the combined weight of components (B) and (C).

3. An electrical or electronic device of claim 1 wherein
   (a) component (A) is present in an amount of from about 70 to about 90 percent by weight based upon the combined weight of components (A), (B) and (C);
   (b) components (B) and (C) are present in a combined amount of from about 30 to about 10 percent by weight of the combined weight of components (A), (B) and (C);
   (c) component (B) is present in an amount of from about 40 to about 60 percent by weight based upon the combined weight of components (B) and (C); and
   (d) component (C) is present in an amount of from about 60 to about 40 percent by weight based upon the combined weight of components (B) and (C).

4. An electrical or electronic device of claim 1 wherein
   (a) component (A) is present in an amount of from about 80 to about 90 percent by weight based upon the combined weight of components (A), (B) and (C);
   (b) components (B) and (C) are present in a combined amount of from about 20 to about 10 percent by weight of the combined weight of components (A), (B) and (C);
   (c) component (B) is present in an amount of from about 45 to about 55 percent by weight based upon the combined weight of components (B) and (C); and
   (d) component (C) is present in an amount of from about 55 to about 45 percent by weight based upon the combined weight of components (B) and (C).

5. An electrical or electronic device of claim 1, 2, 3 or 4 wherein
   (a) component (A) is a polyglycidyl ether of a compound having from about 2.1 to about 8 aromatic hydroxyl groups per molecule;
   (b) component (B) is a polymer of (a) at least one diunsaturated aliphatic compound having from 4 to about 10 carbon atoms; and (b) acrylonitrile, methacrylonitrile or a combination thereof; said polymer having a weight average molecular weight of from about 1,000 to about 20,000;

(c) component (C) is a silicone polymer containing repeating —O—Si(R$_2$)—O— groups wherein each R group is independently an aliphatic group having from 1 to about 6 carbon atoms, said polymer having a weight average molecular weight of from about 10,000 to about 30,000; and (d) component (II) is an aromatic hydroxyl-containing compound having an average of from about 2.1 to about 8 aromatic hydroxyl groups per molecule.

6. An electrical or electronic device of claim 1, 2, 3 or 4 wherein (a) component (A) is a polyglycidyl ether of a compound having from about 2.1 to about 8 aromatic hydroxyl groups per molecule;

(b) component (B) is a polymer of (a) at least one diunsaturated aliphatic compound having from 4 to about 6 carbon atoms; and (b) acrylonitrile, methacrylonitrile or a combination thereof; said polymer having a weight average molecular weight of from about 1,000 to about 15,000;

(c) component (C) is a silicone polymer containing repeating —O—SI(R$_2$)—O— groups wherein each R group is independently an aliphatic group having from 1 to about 4 carbon atoms, said polymer having a weight average molecular weight of from about 3,000 to about 25,000; and (d) component (II) is an aromatic hydroxyl-containing compound having an average of from about 2 to about 10 aromatic hydroxyl groups per molecule.

7. An electrical or electronic device of claim 1, 2, 3 or 4 wherein (a) component (A) is a polyglycidyl ether of a compound having from about 3 to about 7 aromatic hydroxyl groups per molecule;

(b) component (B) is a polymer of (a) at least one diunsaturated aliphatic compound having from 4 to about 6 carbon atoms; and (b) acrylonitrile, methacrylonitrile or a combination thereof; said polymer having a weight average molecular weight of from about 1,000 to about 10,000;

(c) component (C) is a silicone polymer containing repeating —O—Si(R$_2$)—O— groups wherein each R group is independently an aliphatic group having from 1 to about 4 carbon atoms, said polymer having a weight average molecular weight of from about 3,000 to about 25,000; and (d) component (II) is a phenol-formaldehyde or cresol-formaldehyde novolac resin having an average of from about 2 to about 8 aromatic hydroxyl groups per molecule.

8. An electrical or electronic device of claim 1, 2, 3, or 4 wherein (a) component (A) is a cresol-formaldehyde novolac epoxy resin having an average functionality of about 6;

(b) component (B) is an amine containing copolymer of butadiene-acrylonitrile having a weight average molecular weight of about 6400 and an amine equivalent weight of about 1200;

(c) component (C) is a glycidyloxypropyl polydimethylsiloxane having a weight average molecular weight of about 30,000 and an epoxide equivalent weight of about 2,000; and (d) component (II) is a phenol-formaldehyde novolac resin having an average of from about 3 to about 7 aromatic hydroxyl groups per molecule.

9. An electrical or electronic device of claim 1, 2, 3, or 4 wherein (a) component (A) is a cresol-formaldehyde novolac epoxy resin having an average functionality of about 6 and an epoxide content of 22%;

(b) component (B) is a carboxyl-containing copolymer of butadiene-acrylonitrile having a weight average molecular weight of about 16,200 and a carboxyl equivalent weight of 1,800;

(c) component (C) is a glycidyloxypropyl polydimethylsiloxane having a weight average molecular weight of about 20,000 and an epoxide equivalent weight of about 2,000; and (d) component (II) is a phenol-formaldehyde novolac resin having an average of from about 3 to about 6 aromatic hydroxyl groups per molecule.

10. An electrical or electronic device of claim 1, 2, 3, or 4 wherein (a) component (A) is a cresol-formaldehyde novolac epoxy resin having an average functionality of about 6 and an epoxide content of 22%;

(b) component (B) is a carboxyl-containing copolymer of butadiene-acrylonitrile having a weight average molecular weight of 16,200 and a carboxyl equivalent weight of 1,800;

(c) component (C) is polydimethylsiloxane containing an aminopropyl group having a weight average molecular weight of about 9,700 and an amine equivalent weight of about 1,800; and (d) component (II) is a phenol-formaldehyde novolac resin having an average of from about 3 to about 6 aromatic hydroxyl groups per molecule.

11. An electrical or electronic device or claim 1, 2, 3, or 4 wherein (a) component (A) is a cresol-formaldehyde novolac epoxy resin having an average functionality of about 6 and an epoxide content of 22%;

(b) component (B) is a carboxyl-containing copolymer of butadiene-acrylonitrile having a weight average molecular weight of 16,200 and a carboxyl equivalent weight of 1,800;

(c) component (C) is polydimethylsiloxane containing an aminopropyl side chain having a weight average molecular weight of about 27,000 and an amine equivalent weight of about 10,000; and (d) component (II) is a phenol-formaldehyde novolac resin having an average of from about 3 to about 6 aromatic hydroxyl groups per molecule.

* * * * *